T. E. BREWER.
ROTATABLE HEADLIGHT.
APPLICATION FILED OCT. 6, 1915.
1,166,109.
Patented Dec. 28, 1915.
2 SHEETS—SHEET 1.
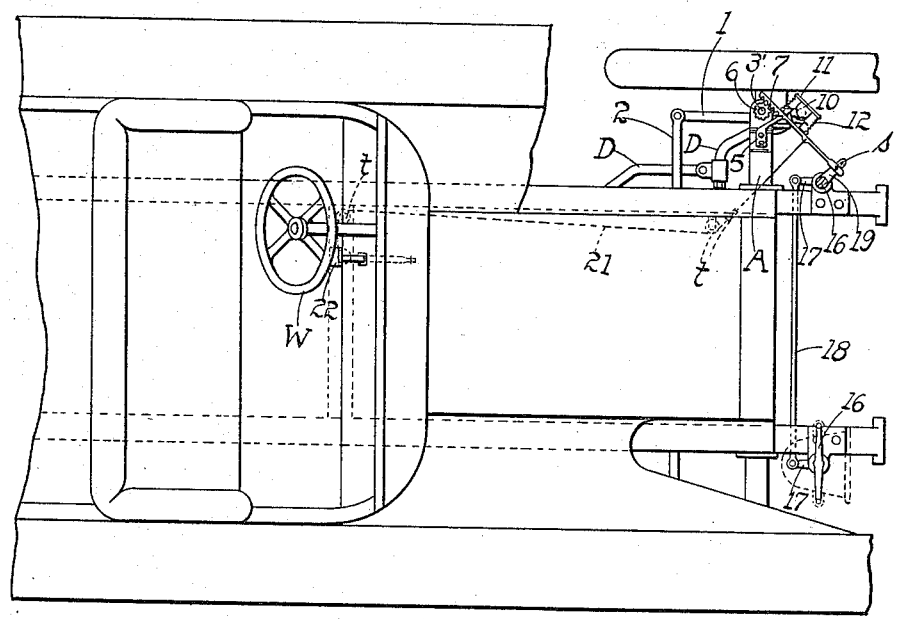
FIG. I.
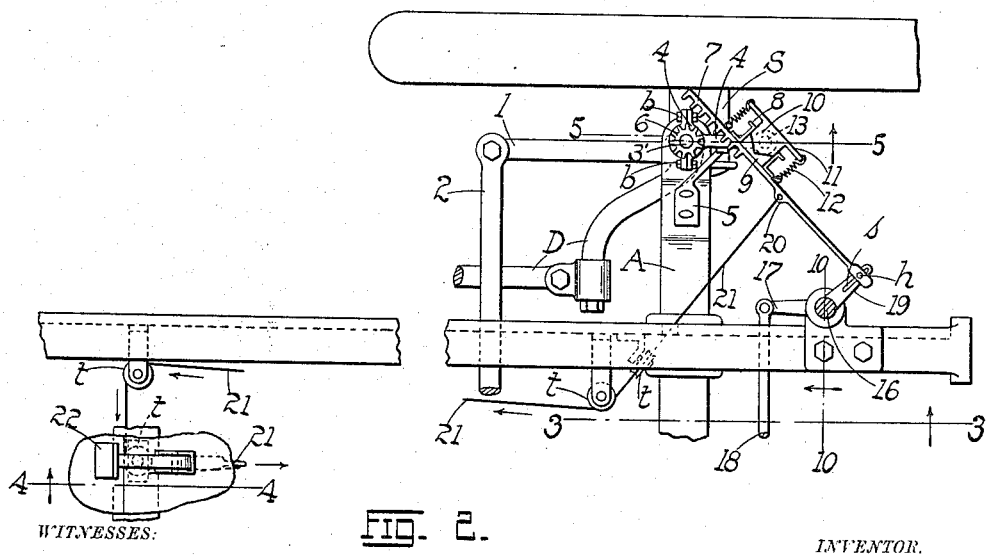
FIG. 2.
WITNESSES:
Harry A. Beimes
Else M. Siegel
INVENTOR.
Thomas E. Brewer
BY
Emil Staren
ATTORNEY.

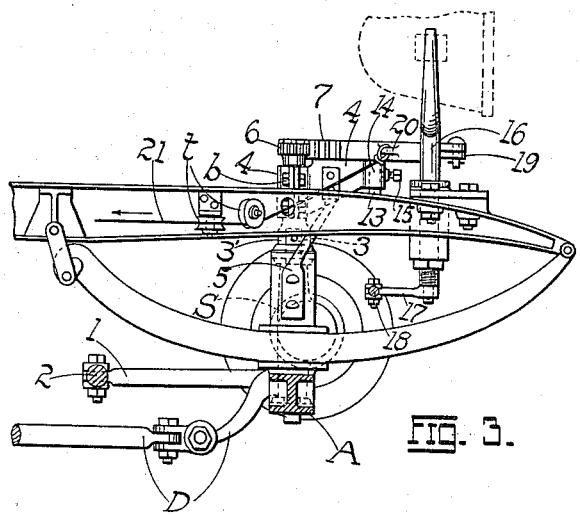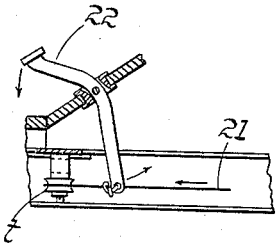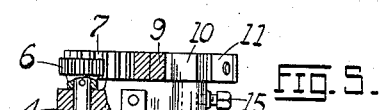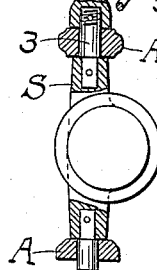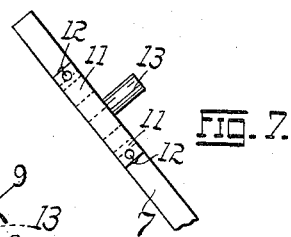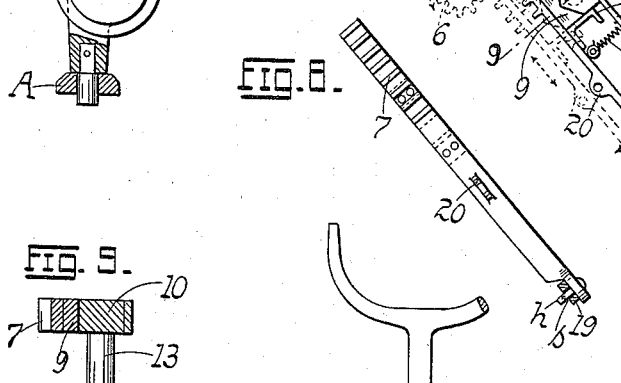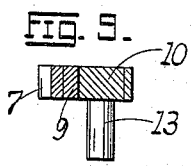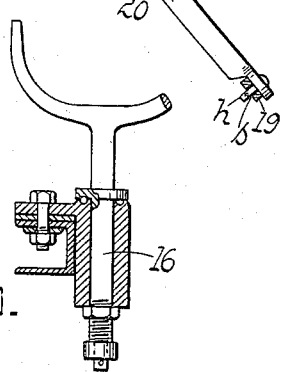

UNITED STATES PATENT OFFICE.

THOMAS E. BREWER, OF GERMANTOWN, ILLINOIS.

ROTATABLE HEADLIGHT.

1,166,109.                    Specification of Letters Patent.        Patented Dec. 28, 1915.

Application filed October 6, 1915. Serial No. 54,472.

*To all whom it may concern:*

Be it known that I, THOMAS E. BREWER, a citizen of the United States, residing at Germantown, in the county of Clinton and State of Illinois, have invented certain new and useful Improvements in Rotatable Headlights, of which the following is a full, clear, and exact description, reference being had to the accompanying drawings, forming a part hereof.

My invention has relation to improvements in rotatable head lights for vehicles such as automobiles and the like, and it consists in the novel features of construction more fully set forth in the specification and pointed out in the claims.

The present invention is directed to mechanism for rotating the head lights of self-propelled vehicles when turning a corner so as to conform to the direction of travel of the vehicle and thus guide the driver or chauffeur in the turning movement.

The object of the improvement is to provide suitable actuating mechanism which will be responsive to the steering gear under the circumstances referred to, provision being made to disconnect said mechanism from the steering mechanism when the vehicle is traveling in a straight line or approximately straight line. This permits of limited manipulations of the steering gear to avoid ruts and depressions, without a rotation of the head light, thus avoiding a wabbling of the light when the vehicle is pursuing a straight path. The advantages of the invention will be fully apparent from a detailed description thereof in connection with the accompanying drawings in which—

Figure 1 represents a top plan of a portion of an automobile with conventional steering gear, showing my invention applied thereto; Fig. 2 is a top plan of the improved mechanism on a larger scale, parts being broken away; Fig. 3 is a vertical longitudinal section on the line 3—3 of Fig. 2; Fig. 4 is a vertical longitudinal sectional detail on the line 4—4 of Fig. 2; Fig. 5 is a vertical sectional detail on the line 5—5 of Fig. 2 with parts in elevation; Fig. 6 is a plan of the rack-bar and guide-block therefor; Fig. 7 is a view at right angles to Fig. 6, looking toward the left of said figure, a part of the bar being broken away; Fig. 8 is a face view of the rack-bar, or looking toward the right of Fig. 6; Fig. 9 is a cross-sectional detail on the line 9—9 of Fig. 6; and Fig. 10 is a vertical sectional detail on the line 10—10 of Fig. 2.

Referring to the drawings, W represents the steering wheel, A, the front axle of the automobile, S, the steering-knuckle cross, 1 the left steering arm, 2 the reach-rod leading to the opposite or right steering arm (not shown), and D the connections between the steering wheel and steering-knuckle, all as well understood in the art, and forming no part of the present invention. In the present embodiment of my invention the upper spindle 3 of the steering-knuckle has its upper terminal screw-threaded, and to said screw-threaded end is secured the spindle extension 3' (Fig. 5) the said extension passing loosely through a bearing or bracket 4 rigidly secured to the axle A by a strap or bracket 5. Preferably, the bearing 4 is made in two sections pased loosely around the spindle extension 3' and clamped together by bolts $b$ as shown in Fig. 2. The spindle-extension 3' projects above the guide-bearing 4 the projecting end carrying a pinion 6 adapted to engage the toothed portion of a rack-bar 7 adjustable to and from the pinion as presently to be fully described. The rack-bar 7 is disposed at an incline to the longitudinal axis of the vehicle, being adjustable to and from the pinion by a movement parallel to the bar, and reciprocable by the pinion when rotation is imparted to the latter. Secured to the outer face of the rack-bar 7, that is to say, the face opposite that on which the rack-teeth are disposed, are a pair of channel pieces 8, 8, the same being disposed on opposite sides of a block 9 secured to or formed integrally with the rack-bar, the outer face of the block being V-shaped or wedge-shaped to receive the corresponding projecting wedge shaped terminal of a coöperating block 10 whose sides are engaged by the guide members 8, 8, (Fig. 6). The block 10 is provided with extension arms 11, 11, whose free ends are coupled to the rack-bar by coiled contracting springs 12 or their equivalents, the tendency of the springs being to draw the rack-bar 7 toward the block 10. The block 10 is provided with a stem 13 which is passed or inserted into the terminal loop or eye 14 of the bearing 4, and held rigidly in place on said bearing by a set-screw 15 passed through the loop and engaging the stem (Fig. 5).

At convenient points on the automobile frame are mounted the usual horizontally rotatable head-light-supporting staffs 16, each provided with an arm 17 which are coupled together by a connecting rod or transverse link 18 as well understood in the art. The staff adjacent the rack-bar 7 is provided with a longitudinally slotted arm 19 whose slot $s$ is freely traversable by a pin $h$ which secures the adjacent end of the rack-bar 7 thereto, the medial portion of the rack-bar being provided with an eye or perforated lug 20 to which is attached the adjacent end of a wire, cord, or cable 21, said wire being passed rearwardly over suitable guide pulleys $t$ placed where needed, the rear end of the wire or cable being fastened to the lower arm of a pedal lever 22 pivotally mounted in front of the driver. By depressing the upper lever arm of the pedal 22, it is obvious that a pull will be exerted on the cable 21 as indicated by the arrows in Figs. 2, 4, 6, causing a draft or pull on the rack-bar 7. This pull on the rack-bar will exert a draft on the springs 12 by which the rack-bar is normally maintained out of engagement with the pinion 6, stretching the springs, and causing the rack-bar to mesh with the pinion.

Once the rack-bar 7 is in mesh with the pinion 6, it is obvious that should the driver turn a corner by imparting rotation to the steering-knuckle S, corresponding rotation will be imparted to the pinion 6 carried by the upper spindle extension 3' of the knuckle, the pinion in turn reciprocating or actuating the rack-bar 7 to cause a deflection of the arm 19 in proper direction to turn the head-light staffs 16 in the same direction as that imparted to the pinion 6. The moment the driver releases the pedal lever, the springs 12 re-assert themselves, thus drawing the rack-bar 7 out of engagement with the pinion 6, permitting the steering gear to be manipulated without disturbing the head-light staffs 16. It will be seen from the foregoing that the rack-bar is accurately guided to and from the pinion by the guide members or brackets 8 and the blocks 9, 10, and by the slot $s$ of the arm 19, which insure a proper adjustment of the bar without binding, the bar moving freely in a direction parallel to itself. It may be stated in this connection that by the time the pedal lever 22 is released after the vehicle has made a turn, the driver has restored the arm 19 to the position indicated in Fig. 2, in which position the slot $s$ is parallel to the direction of movement which it is desired the rack-bar should take in approaching or receding from, the pinion 6, so that the bar moves practically without binding. Of course the block 10 should be so set as to bring its sides into parallelism with the desired direction of movement of the rack-bar, whereby a draft on the bar either by the cable 21 or by the springs 12 will cause it to move truly parallel to itself. I may of course depart from the details here shown without affecting the nature or spirit of the invention.

Features shown but not alluded to are well understood in the art and require no description in the present connection.

It is of course obvious (Fig. 6) that when the rack-bar 7 is in mesh with the pinion 6, the free ends of the members 8, 8, will have been pulled past the vertex or ridge of the beveled end of the stationary block 10, thus leaving the bar free to reciprocate in response to any rotation imparted to the pinion.

Having described my invention what I claim is:

1. In an automobile steering gear, a rotatable steering-knuckle, a pinion carried thereby, a rotatable light-staff, a spring-controlled longitudinally and transversely movable rack-bar interposed between said staff and pinion, and means for effecting engagement between said bar and pinion.

2. In an automobile steering gear, a rotatable steering-knuckle, a pinion actuated thereby, a rotatable light-staff, a spring-controlled longitudinally and transversely movable rack-bar interposed between said staff and pinion, and means under the control of the driver for effecting temporary engagement between said bar and pinion.

3. In an automobile steering gear, a rotatable light-staff, a pinion rotated by the actuation of the steering gear, a spring-controlled longitudinally and transversely movable rack-bar interposed between the pinion and light-staff and normally disengaged from the pinion, and means under the control of the driver for drawing the bar into temporary engagement with the pinion.

4. In an automobile steering gear, a pinion operable with the actuation of said gear, a rotatable head-light staff, a slotted arm secured to said staff, a spring-controlled longitudinally and transversely movable rack-bar loosely coupled at one end to the slotted arm aforesaid, and means for temporarily effecting engagement between said rack-bar and pinion.

5. In an automobile steering gear, a rotatable steering-knuckle, a spindle therefor, a bearing traversed loosely by said spindle, a pinion secured to said spindle outside the bearing, a block rigidly secured to said bearing, a rack-bar, a block on the bar coöperating with the block on the bearing, guide brackets disposed on opposite sides of the block on the rack-bar and slidingly engaging the corresponding sides of the block on the bearing, contracting springs on opposite sides of the block securing the block on the bearing to the rack-bar, a rotatable head-light staff, a slotted arm on said staff coupled loosely to the adjacent end of the rack-bar and means under the control of the driver for drawing the rack-bar into engagement with the pinion, the springs retracting said bar out of said engagement upon release of the means controlled by the driver.

6. In combination with a steering-knuckle, a pinion, a rotatable light-staff, a rack-bar interposed between the staff and pinion, means for adjusting the bar to and from the axis of the pinion in a direction transverse to the longitudinal direction of the bar, and means for causing a longitudinal reciprocation of the bar while in engagement with the pinion for imparting rotation to the light-staff.

In testimony whereof I affix my signature, in presence of two witnesses.

THOMAS E. BREWER.

Witnesses:
EMIL STAREK,
ELSE M. SIEGEL.

Copies of this patent may be obtained for five cents each, by addressing the "Commissioner of Patents, Washington, D. C."